United States Patent [19]

Carlson et al.

[11] Patent Number: 4,718,047

[45] Date of Patent: Jan. 5, 1988

[54] ANALYSIS OF CEMENT BONDING UTILIZING TEMPERATURE PROFILES

[75] Inventors: Norman R. Carlson, Houston; Edward W. Lanuke, Spring; James C. Barnette, Houston, all of Tex.

[73] Assignee: Western Atlas International, Inc., Houston, Tex.

[21] Appl. No.: 700,230

[22] Filed: Feb. 11, 1985

[51] Int. Cl.$^4$ ............................................. G01V 1/40
[52] U.S. Cl. ..................................... 367/35; 181/105; 73/152; 73/154
[58] Field of Search ..................... 367/25, 35; 181/105; 73/152, 154

[56] References Cited

U.S. PATENT DOCUMENTS

| | | | |
|---|---|---|---|
| 2,803,526 | 8/1957 | Nowak | 175/50 |
| 3,480,079 | 11/1969 | Guinn et al. | 166/250 |
| 3,795,142 | 3/1974 | Smith et al. | 73/154 |

OTHER PUBLICATIONS

Cooke, Jr. et al., "Application of Radial Differential Temperature (RDT) Logging to Detect and Treat Flow Behind Casing," SPWLA 20th Annual Logging Symposium, Jun. 3-6, 1979.
Cocanower et al., "Computerized Temperature Decay-an Asset to Temperature Logging," *J. Pet. Tech.* (Aug. 1969), pp. 933-941.
"An Introduction to Single Element Differential Temperature Logging," *Gearhart-Owen Industries, Inc.*, brochure.

*Primary Examiner*—Thomas H. Tarcza
*Assistant Examiner*—Ian J. Lobo
*Attorney, Agent, or Firm*—Patrick H. McCollum

[57] ABSTRACT

A method of determining the presence of channels in the cement behind a well casing utilizing the temperature profiles of the well. In a first embodiment rate coefficients indicative of the rate of temperature change along a zone of investigation are calculated from the geothermal gradient, flowing temperature profile and at least one shut-in temperature profile. These rate coefficients are plotted versus depth, with inconsistencies in the valves of the rate coefficients being indicative of the presence of channels. In a second embodiment rate coefficients are calculated over a well bonded zone of the well casing and utilized to predict shut-in temperatures along the zone of investigation. Differences in the predicted and actual shut-in temperatures is further indicative of the presence of channels.

8 Claims, 2 Drawing Figures

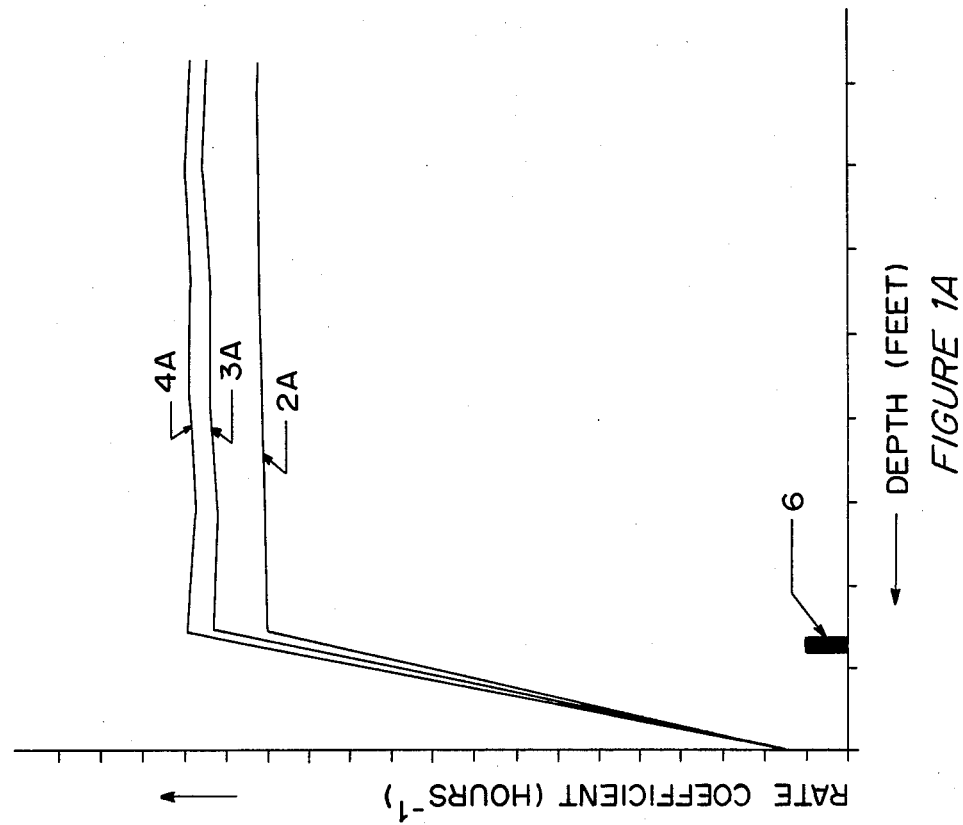
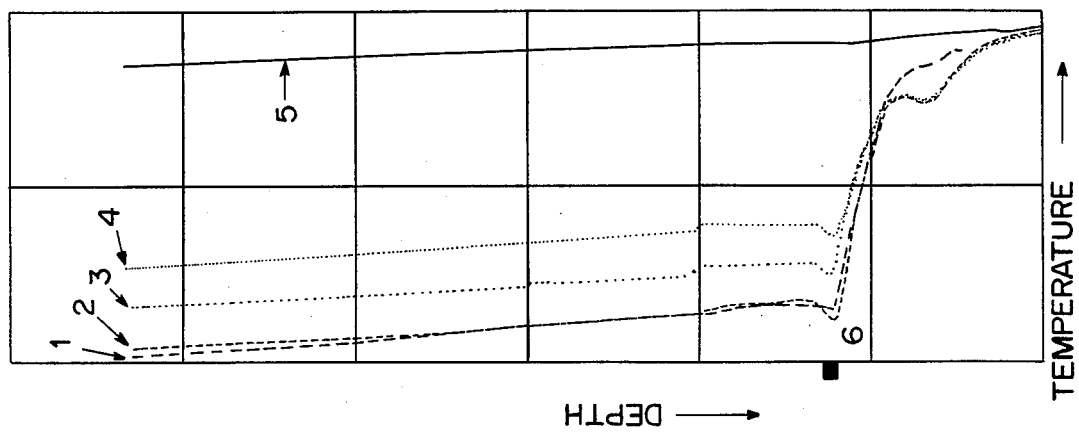

ANALYSIS OF CEMENT BONDING UTILIZING TEMPERATURE PROFILES

BACKGROUND OF THE INVENTION

This invention relates generally to improved well-logging techniques and more specifically to novel methods of determining channels in the cement behind a well casing utilizing the temperature profiles of the well.

It has become common practice in oil and gas drilling operations to set casing within a well to stabilize the walls of the borehole and to cement the several subsurface formations. When this casing is initially placed within the borehole space exists between the outer surface of the casing and the walls of the borehole. Cement is pumped into this space to provide solid fill and to hold the casing in place. Ideally no large void spaces are left between the casing and borehole wall after the cementing process.

It has also become common practice in the completion of oil and gas wells to perforate the casing, cement and surrounding formations to bring a well into production. If, however, a channel exists in the cement behind the casing, unwanted production may result. For example, water may flow from a water sand through a channel within the cement to a perforated interval, pass through the perforations and enter the production flow. Once the existence of this channel is confirmed, the channel can be blocked by a cement squeeze thereby eliminating the unwanted production.

Several techniques are currently available for identifying channels within cement including radioactive tracer logging, acoustic logging and qualitative temperature profile logging, each of which has its shortcomings. Radioactive tracer logging generally requires multiple logging passes, and the results often depend on the distribution of the tracer and the background radiation. Acoustic logging around the perforations may have sensitivity problems due to the noise caused by production, especially gas production. Qualitative temperature profile logging requires that qualitative judgements be made from the appearance and comparison of several temperature profiles in the various qualitative temperature profile logging methods.

These and other disadvantages are overcome by the present invention which provides a method of determining a quantitative rate coefficient based on temperature profiles, the plot of this rate coefficient versus depth being very responsive to the existence of a channel in the cement behind a well casing. This rate coefficient may further be calculated for a well-bonded interval of the well casing and used to predict temperatures at a zone of investigation. Anomalies in the predicted temperatures as compared to the measured temperatures are further indicative of channeling in the cement behind the well casing.

SUMMARY OF THE INVENTION

In a preferred embodiment of the invention, a method is provided which, in its overall concept, utilizes quantitative rate coefficients determined from the geothermal gradient, flowing temperature profile and at least one shut-in temperature profile to confirm the presence of a channel in the cement behind a well casing. The geothermal gradient, flowing temperature profile and at least one shut-in temperature profile at a preselected time after shutting-in the well are measured. These values are used to calculate rate coefficients which are indicative of the rate of temperature change along the zone of investigation. The rate coefficients are then plotted versus depth, with inconsistencies such as the unpredicted abrupt change of the values of the rate coefficients being indicative of the presence of channels. Rate coefficients may also be calculated at well-bonded intervals along the well casing and used to predict temperatures along the zone of investigation. Differences in the predicted temperatures as compared to the measured temperatures are further indicative of the presence of channels.

These and other features and advantages of the present invention will be more readily understood by those skilled in the art from a reading of the following detailed description with reference to the accompanying drawings.

BRIEF DESCRIPTION OF THE DRAWING

FIG. 1 is a composite presentation of various temperature logs of a well including a flowing temperature profile, three shut-in temperature profiles and the geothermal gradient for that particular well.

FIG. 1A is a plot of rate coefficients versus depth as determined from the temperature profiles of FIG. 1.

DETAILED DESCRIPTION OF THE PREFERRED EMBODIMENT

The present invention provides methods of detecting channels in the cement behind a well casing within a well, these channels being in communication with a perforated zone of the well casing. A first embodiment of the invention utilizes temperature profiles within a well to calculate rate coefficients, these rate coefficients being indicative of the rate of temperature change along a zone of investigation. The rate coefficients are plotted versus depth, with inconsistencies, such as the unpredicted abrupt change of the rate coefficient values, indicating the presence of channels. A further discussion of the method of the first embodiment along with an example of its operaton is presented below.

A second embodiment of the invention utilizes temperature profiles within a well to calculate rate coefficients along a well-bonded zone of the well casing, these rate coefficients being indicative of the rate of temperature change along the well-bonded zone. The rate coefficients are used to predict temperatures along the zone of investigation, and are compared to actual temperatures measured along the same zone of investigation. Unpredicted differences in the two temperatures are further indicative of the presence of channels. A further discussion of the method of the second embodiment along with an example of its operation is also presented below.

Both embodiments utilize rate coefficients which are derived from the following relationship:

$$c(D) = \frac{\ln \frac{T_{inj}(D) - T_g(D)}{T_s(D) - T_g(D)}}{dt} \qquad (1)$$

where $c(D)$ = rate coefficient at depth D (hours$^{-1}$);

$T_{inj}(D)$ = flowing temperature during injection at depth D (°F.)

$T_g(D)$ = Geothermal temperature a depth D (°F.);

$T_s(D)$ = shut-in temperature at depth D (°F.); and $dt$ = shut-in time (hours).

The rate coefficients of the first embodiment correspond to the zone of investigation while those of the second embodiment correspond to a well-bonded zone. Both rate coefficients, however, are determined in basically the same manner.

In the preferred embodiment, the variables $T_{inj}(D)$, $T_g(D)$ and $T_s(D)$ are measured by logging various temperature profiles of the well. This logging may be made by any of the standard instrumentalities well known in the art of well logging. These measurements are preferably taken in a log-inject-log sequence: first, the geothermal gradient, $T_g$, is measured over a specified interval of the well (log); next, fluid is injected into the well while the flowing temperature profile, $T_{inj}$, is measured (inject); finally, the well is shut-in and at least one shut-in temperature profile, $T_s$, is measured at a preselected time after shutting-in the well (log). The injection fluid is preferably, but not limited to, water or diesel fuel that enters the perforations at least 10° cooler than the geothermal temperature at the zone of investigation. A separate set of rate coefficients will be generated for each shut-in temperature profile.

In the first embodiment, the temperature profiles are measured in the zone of investigation. From the temperature profiles the rate coefficients are calculated from Equation (1) and plotted versus depth. This calculation and plotting can be done in real time at the wellsite or the data can be stored for later analysis depending upon the operator's needs. Inconsistencies in this plot such as the unpredicted abrupt change of the rate coefficient values indicate the presence of a channel. Predicted changes in the values of the rate coefficients are those caused by variances in the downhole hardware, such variances including heat storage, pipe size and construction materials of such hardware.

Referring now to the drawings in more detail, particularly to FIGS. 1 and 1A, there is illustrated the temperature profile logs and rate coefficient plots, respectively, of a gas well with water production from a suspected channel below the perforations. The well was drilled to a depth of 4905 feet and was perforated between 4636 and 4639 feet. Primary surface casing (8⅝ in. OD) was set to 924 feet and secondary casing (5½ in. OD) was installed from the surface of the total depth. A production tubing string (2⅞ in. OD) was set to 4604 feet with a nipple at 4570 feet. The well was logged in a log-inject-log sequence. First the well was shut-in and the geothermal gradient was measured. Cold water was then injected for 4 hours and the flowing temperature profile was measured. The well was then shut-in again and shut-in temperature profiles were measured at 0.75 hours, 1.3 hours and 2.0 hours after shut-in. FIG. 1 is a composite presentation of the flowing temperature profile 1, 0.75 hour 2, 1.3 hour 3 and 2.0 hour 4 shut-in temperature profiles, and the geothermal gradient 5.

Referring again to FIG. 1A, the plots of rate coefficient versus depth for the 0.75 hour 2A, 1.3 hour 3A and 2.0 hour 4A shut-in temperature profiles all show abrupt changes in the rate coefficient values immediately below the perforations 6, which indicates that cold fluid is present in a channel behind the secondary casing. The plots are generally uniform above the perforations indicating the absence of channels. The small variations above the perforations are caused by the nipple and casing.

In the second embodiment, the temperature profiles are measured in both the zone of investigation and a well-bonded zone of the well casing. From the well-bonded zone temperature profiles a set of rate coefficients is calculated from Equation (1) for each shut-in temperature profile. Each set of rate coefficients is averaged to produce an average rate coefficient, $\bar{c}$, for each shut-in time. These average rate coefficients are then used in accordance with the following relation to produce predicted shut-in temperatures over the zone of investigation:

$$T_s(D) = T_g(D) + [T_{inj}(D) - T_g(D)] \exp{-\bar{c}dt}$$

The predicted shut-in temperatures are compared to actual measured shut-in temperatures, with unpredicted differences in the two values further indicating the presence of channels. Predicted differences in the two values are those caused by variances in the downhole hardware, such variances including heat storage, pipe size and construction materials of such hardware.

Referring back to the previous example, shut-in temperatures were predicted for each shut-in time at two depths. The following chart is a summary of the results:

| Depth (feet) | Shut-in Time (hours) | Predicted (°F.) | Actual (°F.) |
| --- | --- | --- | --- |
| 4660 | 0.75 | 126.9 | 124.9 |
|  | 1.3 | 127.6 | 124.3 |
|  | 2.0 | 128.4 | 124.9 |
| 4675 | 0.75 | 127.4 | 127.2 |
|  | 1.3 | 128.1 | 126.5 |
|  | 2.0 | 128.9 | 126.8 |

As can be seen from the results, all of the predicted temperatures are greater than the actual temperatures which further indicates cold water has entered a channel behind the secondary casing. These results conform to those indicated by the plot from the first embodiment.

Many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

The embodiments of the invention in which an exclusive property or privilege is claimed are defined as follows:

1. A method of detecting a channel in the cement behind a well casing within a well, said channel being in communication with a perforated zone of said well casing, comprising the steps of:
   determining rate coefficients over a zone of investigation for at least one preselected time interval following the shutting-in of said well, said rate coefficients being indicative of the rate of temperature change along said zone of investigation wherein said step of determining rate coefficients over said zone of investigation comprises the steps of:
   measuring the geothermal gradient over said zone of investigation;
   measuring the flowing temperature profile over said zone of investigation;
   measuring at least one shut-in temperature profile over said zone of investigation;
   calculating a set of rate coefficients for each shut-in temperature profile from said geothermal gradient, flowing temperature profile and shut-in temperature profile values, wherein said step of calculating said set of rate coefficients further comprises the step of calculating said rate coefficients in accordance with the relationship:

$$c(D) = \frac{\ln \frac{T_{inj}(D) - T_g(D)}{T_s(D) - T_g(D)}}{dt}$$

wherein c(D) is said rate coefficient at depth D, $T_{inj}(D)$ is the flowing temperature profile value at depth D, $T_g(D)$ is the geothermal gradient value at depth D, $T_s(D)$ is the shut-in temperature profile value at depth D, and dt is said corresponding preselected time interval; and locating values of said rate coefficients indicative of channels in said cement behind said well casing.

2. A method of detecting a channel in the cement behind a well casing within a well, said channel being in communication with a perforated zone of said well casing, comprising the steps of:

determining rate coefficients over a zone of investigation for at least one preselected time interval following the shutting-in of said well, said rate coefficients being indicative of the rate of temperature change along said zone of investigation; and locating values of said rate coefficients indicative of channels in said cement behind said well casing, wherein the step of locating values of said rate coefficients indicative of channels in said cement comprises the step of comparing for each shut-in temperature profile the corresponding set of calculated rate coefficients, whereby inconsistencies in the values of said rate coefficients, such as unpredicted abrupt changes in said values indicate the presence of said channels.

3. The method of claim 2 wherein said step of comparing said calculated rate coefficients comprises the step of plotting each set of rate coefficients versus depth.

4. The method of claim 2, wherein said step of determining rate coefficients over said zone of investigation comprises the steps of:

measuring the geothermal gradient over said zone of investigation;

measuring the flowing temperature profile over said zone of investigation;

measuring at least one shut-in temperature profile over said zone of investigation; and calculating a set of rate coefficients for each shut-in temperature profile from said geothermal gradient, flowing temperature profile and shut-in temperature profile values.

5. The method of claim 4, wherein said step of measuring said flowing temperature profile comprises the steps of:

injecting fluid into said well for a predetermined time interval; and logging the temperature profile over said zone of investigation prior to the cessation of said fluid injection.

6. The method of claim 5, wherein said step of injecting fluid into said well further comprises the step of injecting fluid into said well which enters the perforations at least 10° cooler than the lowest geothermal gradient valve over said zone of investigation.

7. The method of claim 6, wherein said step of injecting fluid into said well further comprises the step of injecting water into said well.

8. The method of claim 4, wherein said step of measuring at least one shut-in temperature profile comprises the steps of:

shutting-in said well after measuring said flowing temperature profile; and logging the temperature profile over said zone of investigation at said preselected time interval after shutting-in said well.

* * * * *